United States Patent
Nishihira (10) Patent No.: US 7,016,154 B2
(45) Date of Patent: Mar. 21, 2006

(54) MAGNETIC RECORDING DISK HAVING A SAFE ZONE

(75) Inventor: Henry S. Nishihira, San Jose, CA (US)

(73) Assignee: Komag, Inc., San Jose, CA (US)

( * ) Notice: Subject to any disclaimer, the term of this patent is extended or adjusted under 35 U.S.C. 154(b) by 289 days.

(21) Appl. No.: 10/382,635

(22) Filed: Mar. 5, 2003

(65) Prior Publication Data

US 2004/0174630 A1 Sep. 9, 2004

(51) Int. Cl.
*G11B 5/82* (2006.01)

(52) U.S. Cl. ...................................................... 360/135
(58) Field of Classification Search ................ 360/135; 428/694 BR
See application file for complete search history.

(56) References Cited

U.S. PATENT DOCUMENTS

| | | | |
|---|---|---|---|
| 5,377,058 A | 12/1994 | Good et al. | |
| 5,673,156 A | 9/1997 | Chen et al. | |
| 5,798,164 A | 8/1998 | Weiss et al. | |
| 5,870,250 A | 2/1999 | Bolasna et al. | |
| 5,870,265 A * | 2/1999 | Boutaghou | 360/135 |
| 5,875,083 A | 2/1999 | Oniki et al. | |
| 6,020,045 A | 2/2000 | Chen et al. | |
| 6,057,984 A | 5/2000 | Arita et al. | |
| 6,075,683 A | 6/2000 | Harwood et al. | |
| 6,139,936 A | 10/2000 | Weiss | |
| 6,330,124 B1 | 12/2001 | Tsukamoto et al. | |
| 6,381,090 B1 | 4/2002 | Suzuki et al. | |
| 6,473,259 B1 | 10/2002 | Kuo et al. | |
| 6,529,347 B1 | 3/2003 | Hipwell et al. | |
| 6,563,673 B1 | 5/2003 | Mundt et al. | |
| 6,597,539 B1 | 7/2003 | Stupp et al. | |
| 2002/0024774 A1 | 2/2002 | Berger et al. | |
| 2002/0030937 A1 | 3/2002 | Liu | |
| 2002/0181153 A1 | 12/2002 | Kang | |

FOREIGN PATENT DOCUMENTS

| | | |
|---|---|---|
| WO | WO02/19330 A1 | 3/2002 |
| WO | WO02/084650 A1 | 10/2002 |

OTHER PUBLICATIONS

Patent Abstracts of Japan, Publication No. 11-273061, Aug. 10, 1999.
Patent Abstracts of Japan, Publication No. 2000-251249, Sep. 14, 2000.
Patent Abstracts of Japan, Publication No. 09-167305, Jun. 24, 1997.
Patent Abstracts of Japan, Publications No. 09-081932, Mar. 28, 1997.
Patent Abstracts of Japan, Publication No. 2000-293840, Oct. 20, 2000.
Shoji Tanaka et al. "Characterization of Magnetizing Process for Pre-Embossed Servo Pattern of Plastic Hard Disks", IEEE Transactions on Magnetics, vol. 30, No. 6, Nov. 1994, p. 4209-4211.

* cited by examiner

*Primary Examiner*—Robert S. Tupper
(74) *Attorney, Agent, or Firm*—Blakely, Sokoloff, Taylor & Zafman LLP (57) ABSTRACT

A disk drive having a magnetic recording disk with a safe zone is described. A surface texture of the safe zone induces the head to fly at a greater height than while over data zones of the disk.

10 Claims, 10 Drawing Sheets

HEAD FLY
DIRECTION
18

MAGNETIC RECORDING DISK HAVING A SAFE ZONE

TECHNICAL FIELD

Embodiments of the invention relate to the field of disk drives and, more specifically to disks use in disk drive systems.

BACKGROUND

In the field of hard disk storage systems, continuous improvements have been made in increasing the a real density (i.e., the number of stored bits per unit of surface area) of the magnetic recording disks. As is well known, decreasing the fly height of the read/write head, for example, results in reduced PW50 (the pulse width where the read head output amplitude, in response to an isolated transition, is 50% of the peak value) that allows for greater recording density. Bringing the head closer to the media has been a key area of effort in increasing recording densities.

In current disk drive systems that employ flying heads, there is a protective film of air between the head and the disk, where no contact is intended to occur during head read/write operations. The read/write head is typically a part of or affixed to a larger body that flies over the disk and is typically referred to as a "slider." The slider has a lower surface referred to as an air bearing surface (ABS). The ABS generally generates a positive air pressure. In addition, there is often a cavity or similar structure that creates a sub-ambient pressure to counterbalance the positive pressure to some extent. The slider body is attached to a suspension via a head gimbal assembly that biases the slider body towards the disk. The net effect of the ABS and the suspension is to cause the slider to fly at the desired height when the disk is at full speed. The net effect also causes the slider to be in contact with the disk surface, when the disk is at rest, in contact-start-stop (CSS) disk drive systems. This contact between the slider and the disk occurs in an area when the drive is turned on and off, and is known as a CSS zone. Other types of disk drive systems, referred to as load ramp drives, park the head on a ramp, and not the disk surface, when the drive is turned off.

In both types of disk drive system, the head is idle and flies over data zones while the disk is rotating awaiting instruction during a significant portion of the time in operation. As the flying height of the read-write head is reduced in the effort to increase recording densities, the frequency and likelihood of intermittent contact with the disk increases during drive operations. Such intermittent contact may cause the head to fly unstably and result in erroneous read back of data. In the worst-case scenario, if the impact of a hit is too severe, it may cause a head crash and damage the head and/or disk. Since the disk rotates very fast during normal operation of the drive, a concern is that the head should not undesirably contact the disk.

The ever increasing areal density demands are driving some advanced designs of disk drive systems to utilize contact-type or near contact type magnetic head technology, where the head is in direct contact with the disk when in operation. One problem of utilizing this head technology is that the continuous wear from the head will degrade the disk's surface by the slow displacement of lube and eventual wear of the protective carbon coating from the disk's surface. Such wear will eventually leading to catastrophic failure and loss of data. Another problem with contact or near contact recording head technology is head degradation, by way of flash temperatures (e.g., momentary, ultra-high temperatures from friction between head and disk), that may render the magnetic head transducer sensitivity unusable by the switching of the magnetic pin layer fields. Furthermore, the head and magnetic disk interface will be subject to higher sensitivity to both particulate and outgassing contamination that will result in heightened risks for thermal asperity or high fly read or write errors.

BRIEF DESCRIPTION OF THE DRAWINGS

Embodiments of the invention may best be understood by referring to the following description and accompanying drawings that are used to illustrate embodiments of the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

A safe zone on a magnetic recording disk is disclosed to enhance the reliability of a magnetic disk drive system. The safe zone on the magnetic recording disk causes a head over the safe zone to fly at a higher distance than the fly height of the head when the disk drive is in operation (e.g., during a write or a read operation). One or more safe zones may be dispersed between data zone tracks of the disk, near the inner diameter of the disk and/or near/at the outer diameter of the disk. The head is induced to fly higher by altering the disk's surface structure and/or texture in a safe zone(s) from the surface structure and/or texture in the data zones of the disk. The higher fly height of the head over a safe zone reduces contact wear and enhances mechanical reliability of a disk drive system.

Figure 1:
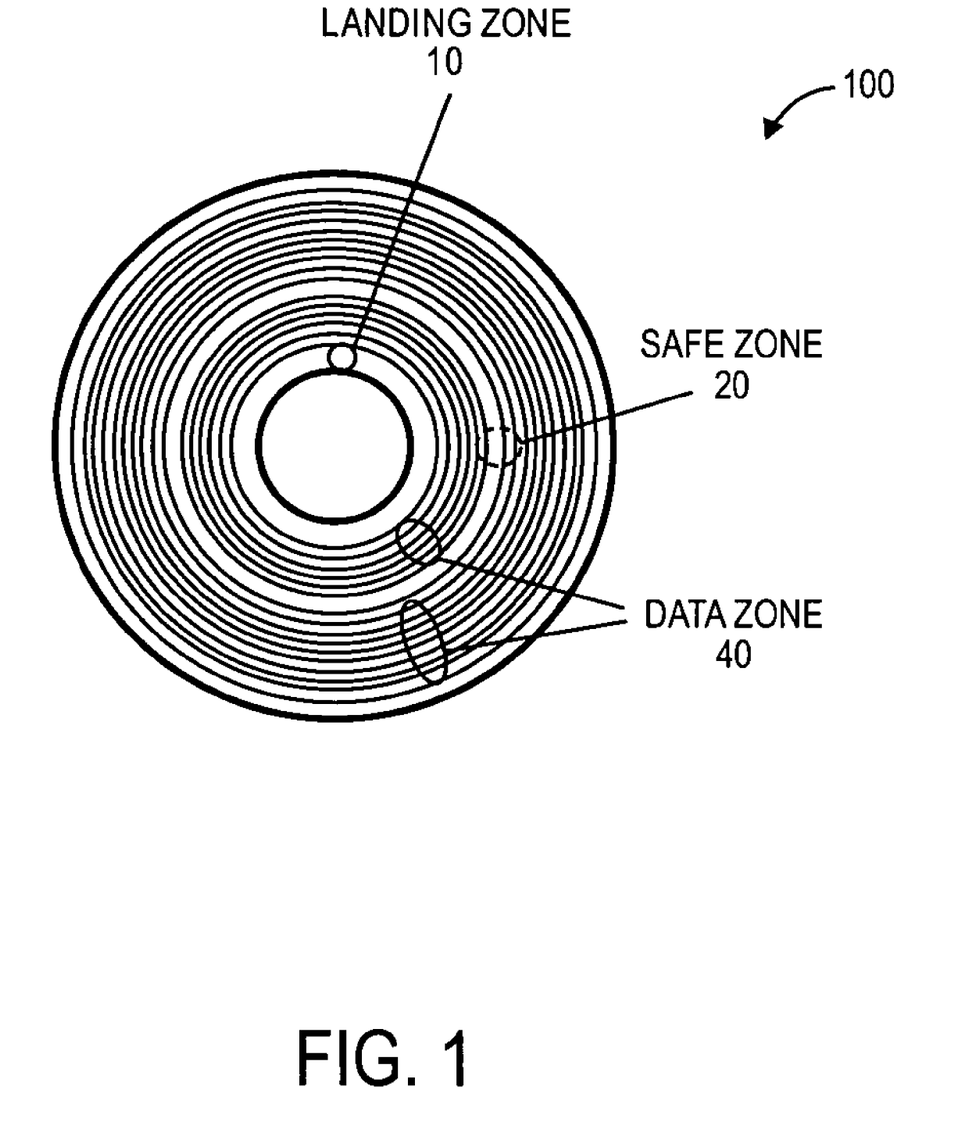
FIG. 1 illustrates a top view of one embodiment of a magnetic disk of a disk drive system.

FIG. 1 illustrates a top view of one embodiment of a magnetic recording disk 100 of a disk drive system. The magnetic disk 100 includes a landing zone 10, a safe zone 20, and data zones 40. Landing zone 10 is where a head resides when the disk 100 is not rotating. In one embodiment, the landing zone 10 may be a CSS zone in a CSS type disk where the head is in contact with the disk when the disk is not rotating. In order to increase the storage capacity of the disk 100, the inner diameter (ID) region on the disk may be used for the CSS zone. Alternatively, other regions such as a more central region or an outer diameter region may be used for the landing zone 10. In one embodiment, the CSS zone has a texture pattern (e.g., a laser induced bump texture) that reduces stiction when the head 110 lifts off from or lands on the landing zone 10. Alternatively, the landing zone may be a non-contact area residing beneath a ramp in load type disk drive systems where the head is parked on the ramp, and not the disk surface, when the disk is not rotating.

The safe zone 20 is a zone having a surface structure and/or texture that induces the head to fly higher when the head is idling, as will be further described below. The surface texture of the safe zone 20 is different from the surface textures of the intended data zones 40 and the landing zone 10, as is described below. The data zones 40 may include magnetic material that may be manipulated to store data in a manner known to those of skill in the art. Although, two data zones 40 are illustrated in FIG. 1, disk 100 may have more or less than two data zones. In one embodiment, data zones 40 include a DTR pattern as discussed below in relation to FIG. 2. Alternatively, safe zone 20 is also suitable for use with non-DTR patterned disks.

Although the safe zone 20 is illustrated as being located in a central location between two data zones, it should be understood that one or more safe zones 20 could be located anywhere on the magnetic disk 100. For example, a safe zone 20 could be located at either the inner or outer diameters of the disk, or interspaced at one or more radii positions across the disk 100. The interspacing of the one or more positions of the safe zone 20 allow for a shorten distance of the movement of the head 110 from the data zones 40 to the safe zone 20 when the head 110 is idling, thereby minimizing degradation of average access time.

Figure 2:
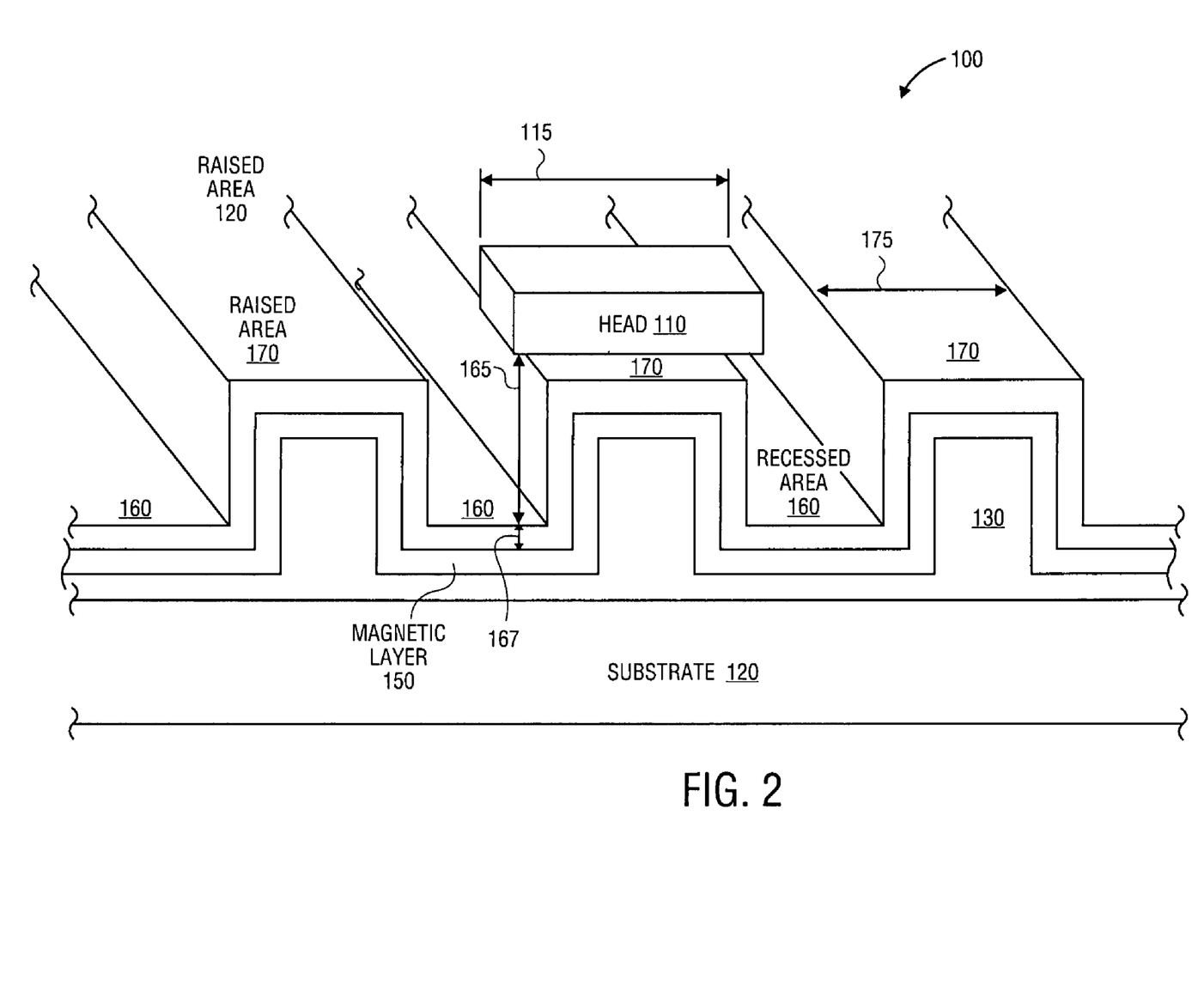
FIG. 2 illustrates a cross-sectional perspective view of one embodiment of a patterned data zone of the magnetic disk and a head.

FIG. 2 illustrates a cross-sectional perspective view of a patterned data zone of a magnetic disk and a head. The disk 100 includes multiple film layers, some of which have been omitted for clarity of the following discussion. During operation of the disk drive, reading and writing of data on the data zones 40 of the disk 100 is accomplished by flying a head 110 over the rotating disk 100 in a manner well known to those of ordinary skill in the art.

For example, to perform a write operation (e.g., to store data) to the disk 100, the head 110 is positioned above a writable data track of data zones 40 to change the polarization of the magnetic media of disk 100 and, thereby, store electronic data. The head 110 may be, for example, a dual element head having a read element for performing a read operation and a write element for performing a write operation, such as a giant magneto-resistive (GMR) head. Alternatively, the head 110 may be another type of head, for examples, a magneto-resistive (MR) head or an inductive head having a common element for performing both read and write operations. Recording heads are known in the art; accordingly, a detailed description is not provided.

In one embodiment, disk 100 may include a discrete track recording pattern formed, for example, in patterned layer 130. One method for increasing recording densities is to pattern the surface of a disk to form discrete data tracks, referred to as discrete track recording (DTR). DTR disks typically have a series of concentric raised zones (e.g., hills, lands, elevations, etc.) storing data and recessed zones (e.g., troughs, valleys, grooves, etc.) that may store servo information. The recessed zones separate the raised zones to inhibit or prevent the unintended storage of data in the raised zones. A discrete stamped pattern may be embossed, or otherwise formed, into the patterned layer 130 with the magnetic layer 150 disposed above the patterned layer 130, either before or after embossing. When data are written to the patterned recoding medium, the raised areas 170 constitute the data tracks. Information, such as servo (head positioning) information may be stored in the recessed areas 160. Alternatively, servo information may be interleaved with data in sectors and stored on the raised areas 170. The raised areas 170 and recessed areas 160 are typically formed as alternating concentric circles although other configurations (e.g., spiral) are contemplated. Therefore, the recessed areas 160 isolate the raised areas 170 (e.g., the data tracks) from one another, resulting in data tracks that are defined both physically and magnetically. The formation of a DTR pattern is known in the art; accordingly a detailed description is not provided.

Electronic drive intelligence software may be used by the magnetic disk drive system to control the movement of the head 110 in the landing zone 10, the safe zone 20, and the data zones 40. In one embodiment, when the disk drive system is rotating and the head is not performing a read-write operation (e.g., idling), the electronic drive intelligence software directs the head 110 over the safe zone 20, as will be described in further detail below in relation to FIG. 5.

The substrate 120 of disk 100 may be textured, and multiple film layers (e.g., magnetic recording layer 150) disposed above the substrate 120. In one embodiment, the disk 100 may be manufactured with a glass substrate or a metal/metal alloy substrate. Glass substrates that may be used include, for example, a silica containing glass such as borosilicate glass and aluminosilicate glass. Metal alloy substrates that may be used include, for example, AlMg substrates. In an alternative embodiment, other substrate materials such as polymers and ceramics may be used.

In one embodiment, one or mores textures may be generated on the surface of the substrate 120 (or on a layer disposed on the substrate, e.g., a plated NiP layer) for one or more of the zones (landing zone 10, a safe zone 20, and a data zones 40). In one embodiment, the data zones 40 may be textured to produce a desired magnetic orientation in the magnetic film layer 150 that is deposited on the disk 100. The texturing of the data zones 40 may encourage preferred circumferential orientation of the magnetic media of magnetic recording layer 150. Preferred circumferential orientation of the magnetic media on disk 100 may aid in achieving optimal signal-to-noise ratio (SNR) and resolution to obtain the best possible performance from the magnetic media.

Figure 3A:
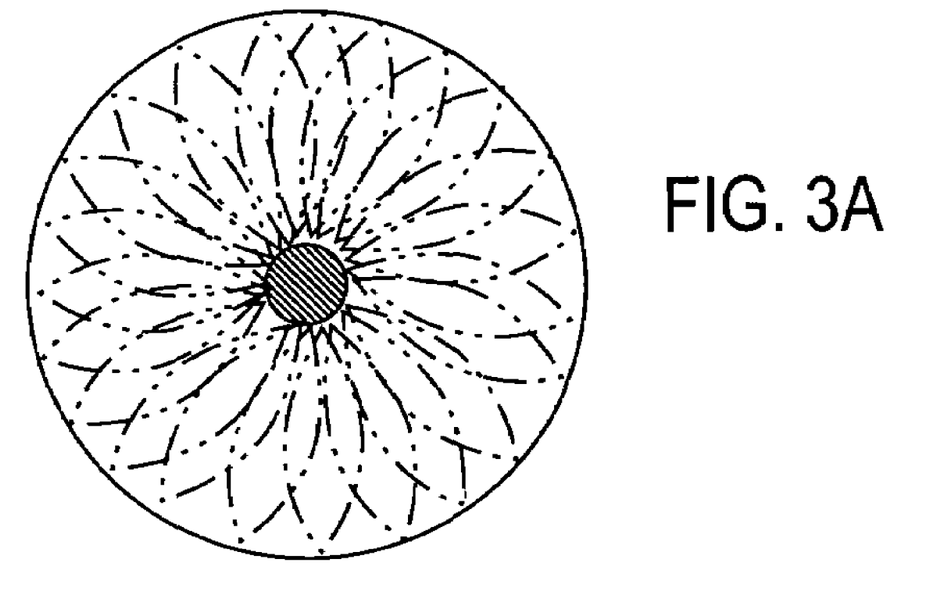
FIGS. 3A, 3B, and 3C illustrate alternative embodiments of data zone texture patterns.
Figure 3B:
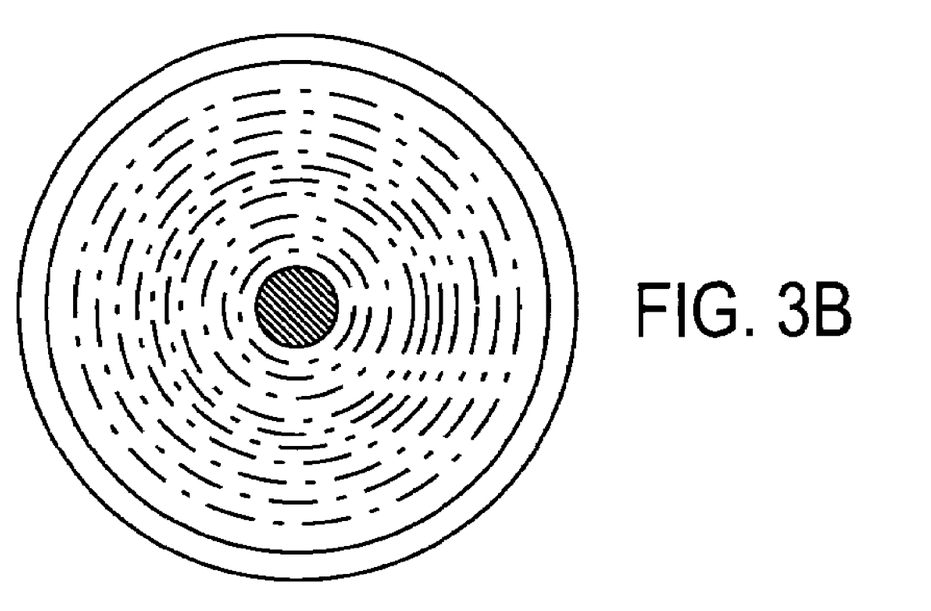
Figure 3C:
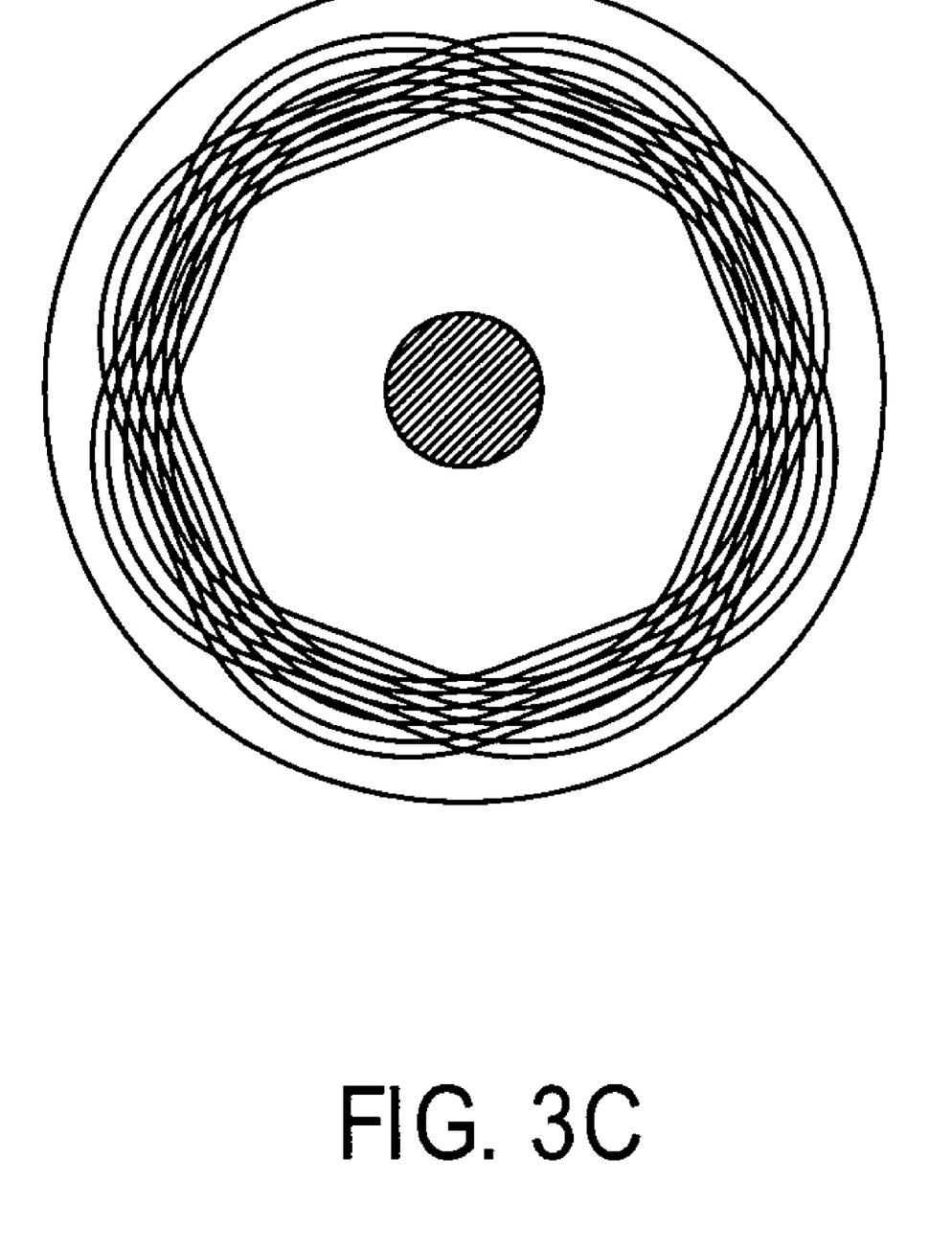

FIGS. 3A, 3B, and 3C illustrate alternative embodiments of data zone texture patterns. FIG. 3A illustrates a magnetic disk having a rosette texture pattern. FIG. 3B illustrates a magnetic disk having a circumferential texture pattern. FIG. 3C illustrates a magnetic disk having a crosshatch texture pattern. For example, in one embodiment, the circumferential texture pattern shown in FIG. 3B has microscopic circumferential (or substantially circumferential) grooves or scratches on the surface of the raised zones of the substrate 120. Substrate 120 may be mechanically textured using fixed or free abrasives. To generate a cross-hatch texture, for example, a substrate is clamped to the spindle platform that rotates during operation. A tape, treated with a diamond slurry, is mounted on the tape roller and positioned against the substrate. The machine is configured to oscillate the spindle, thereby moving the substrate back and forth, while the tape roller presses the tape against the surface of the substrate. The grooves in the substrate are created by the trajectories of individual diamond particles moved across the substrate surface. The resulting texture pattern made by the trajectories is a function of the frequency of both the substrate platform oscillation and the frequency of the substrate platform rotation.

With certain frequencies, the particulate trajectories will not retrace themselves during successive disk rotations and, thus, generate groove crossings that interweave to form a cross-hatch texture in the substrate, as illustrated in FIG. 3C. Alternatively, other oscillation and rotation frequencies may be used. For example, if the oscillation and rotation frequencies are matched (or e.g., have an integer ratio), or the platform/tape is not oscillated, the tape particulate trajectories result in a circumferential texture pattern in the substrate, as illustrated in FIG. 3B. Alternatively, other texturing methods may be used such as emboss texturing and laser texturing. It should be understood that the invention is not limited to the texture patterns described herein, and alternative texture patterns well known to those of ordinary skill in the art may also be used.

In one embodiment, the landing zone 10 (e.g., functioning as a CSS zone) may be textured to reduce stiction between head 110 and the surface of disk 100. In order to improve the CSS performance, it is well understood that friction must be minimized between the slider and the disk. Static friction, or stiction, is a term used to describe the force exerted against the motion of the head relative to the disk surface when the head is at rest on the disk surface. The CSS texture pattern may be put on the disk by mechanically abrading the substrate surface using well known methods. Alternatively, other methods may be used to provide the necessary texture in the CSS zone, for example, laser texturing. In laser texturing, a laser beam is focused to a small spot on the disk surface, forming uniformly shaped and sized textures in a controllable pattern.

In contrast to the requirements of CSS operation, for reading or writing data it is desirable that the surface of the top most layer above data zones 40 be as smooth as possible to allow the head to fly as close as possible to the disk surface. Because of these differing requirements, the landing zone 10, when the disk is used for CSS disk drives, is textured more heavily than the data zones 40 portions of the disk used for data storage so that the texturing on the substrate's surface propagates through the subsequently deposited layers to appear on the surface of the top most layer (e.g., overcoat protection layer) on disk 100.

Because the data zones 40 is smoother than a CSS zone, both the glide height (minimum distance at which a head slider may fly without contacting any portion of the disk surface) and the glide avalanche height (distance above mean disk surface level at which the head slider makes regular and continuous contact with the disk surface) are lower in the data zones 40 than in the CSS zone. As such, when the head is moved from over the data zones 40 to the CSS zone, the glide avalanche height of the head 110 increase because the head 110 must be able to safely move between the two zones, without undue contact in the CSS zone that could lead to wear of the disk surface, the slider, and generation of debris. However, such increase in height does not occur during read/write operations or idling of the head. Rather, such increase in head height only occurs during a powering down of the system when the disk drive is turned off.

Figures 6, 6A, 6B, 6C, 6D:
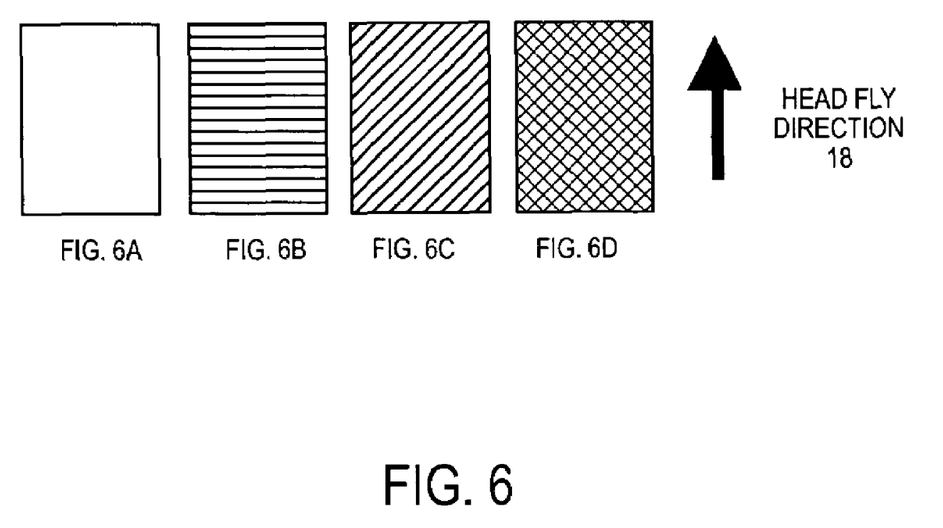
FIGS. 6A, 6B, 6C, and 6D illustrate alternative embodiments of safe zone disk surface textures.

FIGS. 6A–D illustrate alternative safe zone disk surface textures that may be used to induce a head to fly higher than when the head is over a data zone. For example, the surface of the disk 100 in the safe zone 20 may be a planar smooth surface without a DTR pattern structure as illustrated in FIG. 6A. The planar surface may be a two-dimensional surface, which is substantially flat, with a substantially uniform depth and thickness. FIG. 6B illustrates a safe zone surface structure having radial grooves. In one embodiment, the grooves are oriented radially at a spacing of approximately 10-micron pitch with lands that are approximately 10 microns wide. FIG. 6C illustrates a safe zone surface structure having slanted grooves. FIG. 6D illustrates a safe zone surface structure having cross-hatched grooves. It should be understood that, in one embodiment, the depth of the grooves in the safe zone may be the same or less than the depth of the grooves relative to the planar surface in the data zone. It should also be understood that the angles formed by the cross-hatched grooves in the safe zone are different from the angles formed by the cross-hatch texture in the data zone. For example, the angles formed in the data zone are greater than the angles formed in the safe zone (e.g., 20 to 70 degrees made by the cross-hatch in the safe zone).

It should be appreciated that in each of the safe zone surface structures illustrated in FIGS. 6A–D, the spacing of the groove and land geometry is optimized to alter the fly height higher than over the data zone (e.g., circumferential DTR pattern surface structure). In each of the FIGS. 6A–D embodiments, the surface patterns induce the head to fly higher by lessening the amount of air leakage pressure building up under the head when the head is flying in the head fly direction 18. It should be understood that yet other texture patterns may also be used to increase the flight height of the head 110, for example, a texture comprised of a matrix of circles.

In should be appreciated that the texture pattern illustrated in FIGS. 6B, 6C, and 6D may also act as a cleaning surface for the air bearing surface (ABS) of head 110 in contact type recording drive systems. The grooves, oriented transversely to the fly direction 18 of the head, act as a "shoe scraping" effect on the ABS.

One or more embossing tools, or stampers, may be used to create a discrete track pattern and/or the safe zone texture on the disk 100. In one embodiment, a stamper may be generated with a texture that is imparted to the raised areas 170 of the discrete track pattern in the data zone. In an alternative embodiment, a laser texture tool, well known to those of ordinary skill in the art, may be used to generate the various safe zone patterns on the disk 100. In one embodiment, the safe zone 20 would be sized substantially to the width of the head, (e.g., approximately 1 mm in width).

Figure 4A:
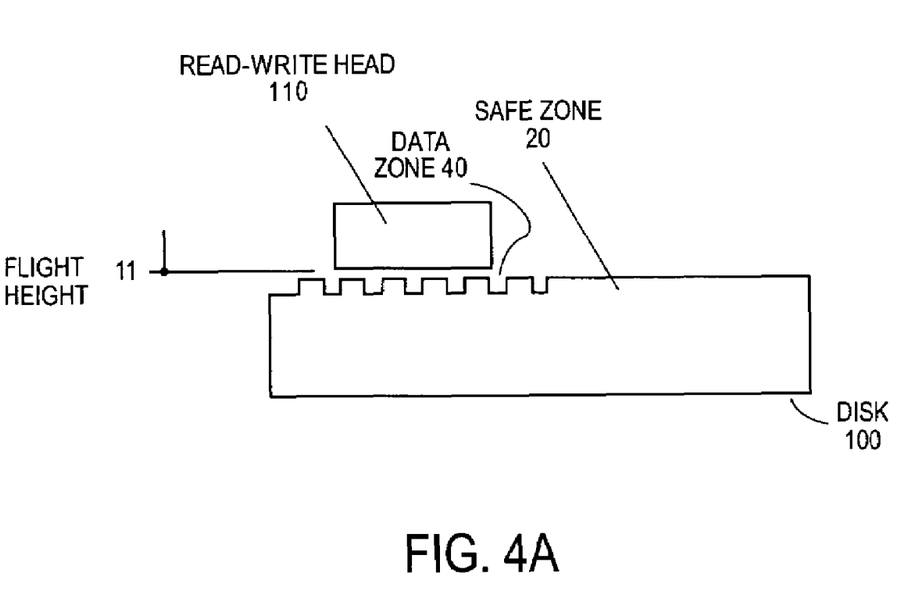
FIGS. 4A and 4B illustrate a cross-sectional view of one embodiment of the magnetic disk.
Figure 4B:
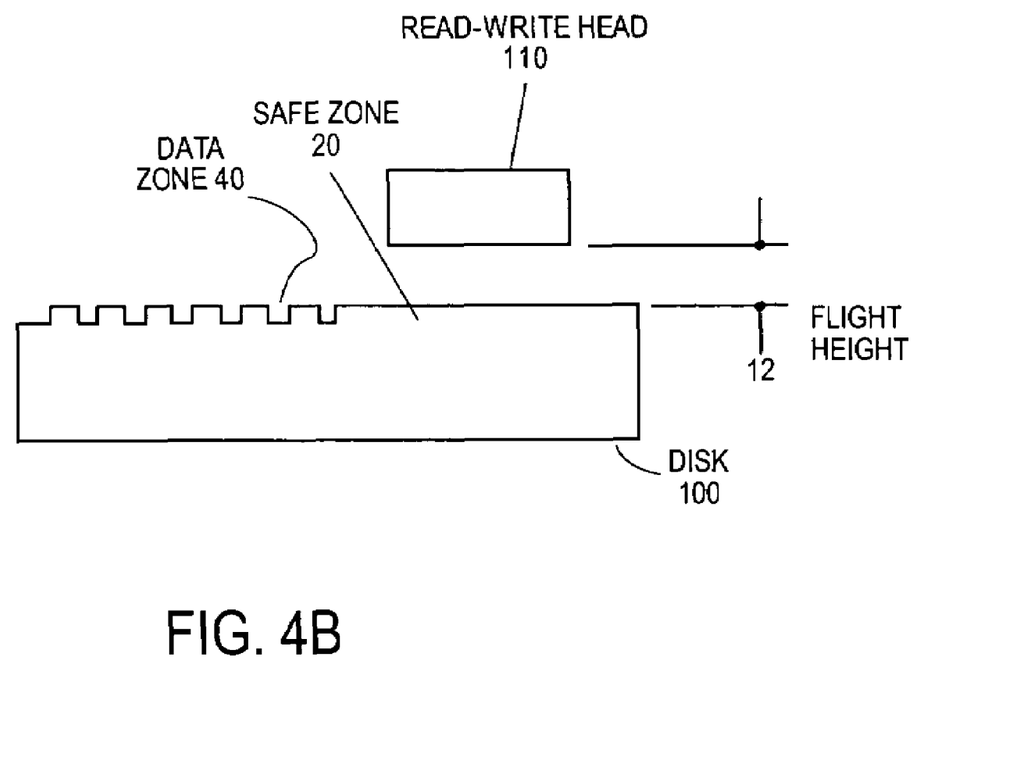
Figure 5:
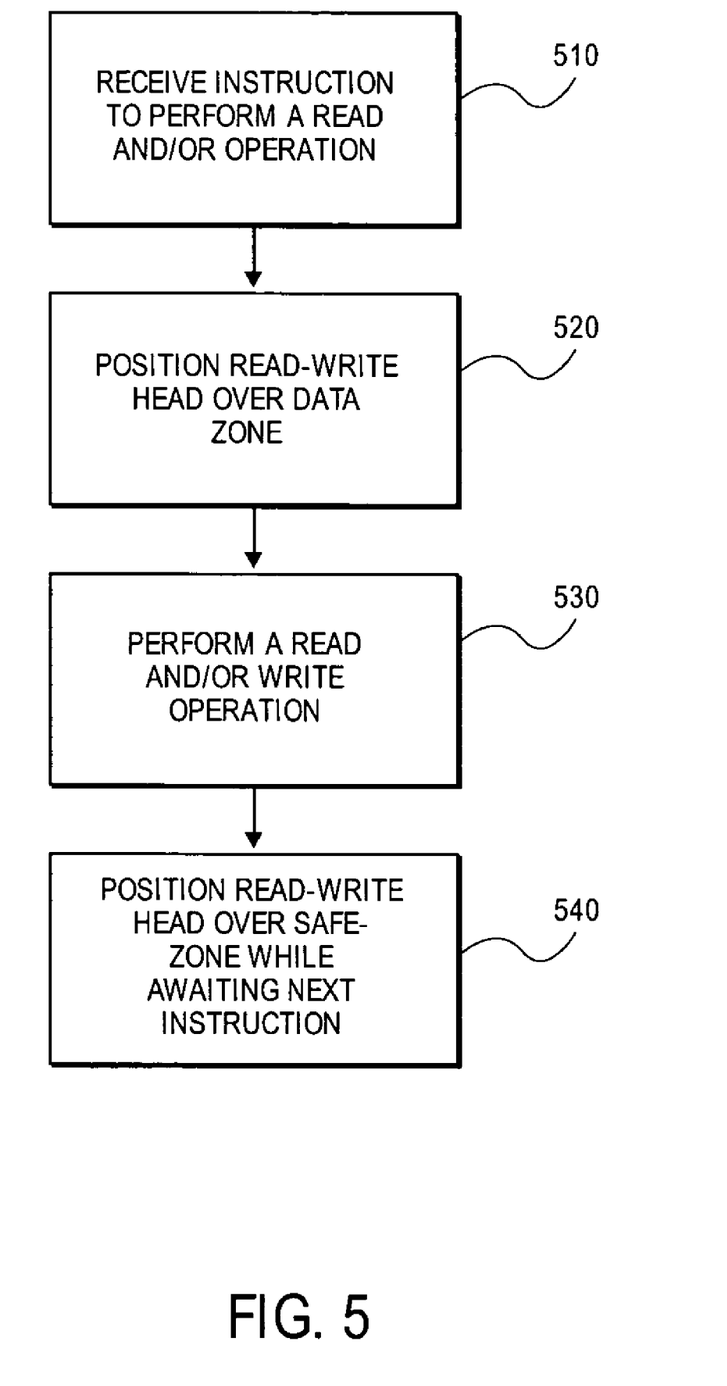
FIG. 5 illustrates one embodiment of a process flow for positioning the head over the safe zone with reference to FIGS. 4A and 4B.

FIGS. 4A and 4B illustrate a cross-sectional view of the magnetic disk 100 having a data zone and a safe zone. FIG. 5 illustrates a process flow for positioning a head 110 over a track of safe zone 20 with reference to FIGS. 4A and 4B. At block 510, the electronic drive intelligence software receives an instruction to perform a read and/or write operation to the data zones 40 of the magnetic disk 100. At block 520, the head 110 is positioned over the data zones 40 at a flight height 11 to perform the read and/or write operation, as shown in FIG. 4A. For example, a typical flight height over a data zone may be 2.5 to 7.6 nanometers. Whereas the typical flight height over a safe zone may be 3.63 to 11.02 nanometers, an approximate 45% higher flight height than when over the data zone.

At block 530, the read and/or write operation is performed. At block 540, upon completing the read and/or write operation, the head 110 is positioned over the safe zone 20 at a flight height 12, as shown in FIG. 4B. In this way, the fly height 12 of the head 110 over the safe zone 20 is greater than the fly height 111 of the read-write 110 when over the data zones 40. Typically, after performing a read and/or write operation, the head 110 becomes idle and the magnetic disk 100 continues to rotate, awaiting a subsequent instruction.

The ability to increase the flight height provides clearance between the head 110 and disk 100 thus mitigating abrasive wear of the head 110 and disk 100. This is particularly desirable in disk drive systems utilizing contact or near contact recording head technology because such systems require either closer proximity or direct contact magnetic technology between the head and magnetic disk. It should be appreciated that since drive systems are not continuously reading and writing, a significant amount of time of head disk abrasion may be avoided by repositioning the head over one or more of the safe zone 20, where the head 110 would fly higher, thereby increasing the clearance between the head 110 and disk 100, and avoiding contact with the disk while the disk system is idling and not performing a read-write operation. In this way, the mechanical reliability of this head disk interface is greatly enhanced.

Following block 540, the electronic drive intelligence software may either instruct the head 110 to perform a subsequent read and/or write operation in the data zones 40, or instruct the head 110 to return to the landing zone 10. In the landing zone 10, the head 110 rests directly on the surface of the landing zone (in the embodiment where landing zone is a CSS zone) and the disk 110 ceases to rotate until a new operating instruction is received.

It will be appreciated that more or fewer processes may be incorporated into the method illustrated in FIG. 5 without departing from the scope of an embodiment of the invention and that no particular order is implied by the arrangement of blocks shown and described herein. It further will be appreciated that the method described in conjunction with FIG. 5 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components.

The method may be provided as a computer program product that may include a machine-readable medium having stored thereon instructions that may be used to program a computer (or other electronic devices) to perform the method. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and a carrier wave that encodes a data signal. Furthermore, it is common in the art to speak of software, in one form or another (e.g., program, procedure, process, application, module, logic. . . ), as taking an action or causing a result. Such expressions are merely a shorthand way of saying that execution of the software by a computer causes the processor of the computer to perform an action or produce a result.

Figure 7:
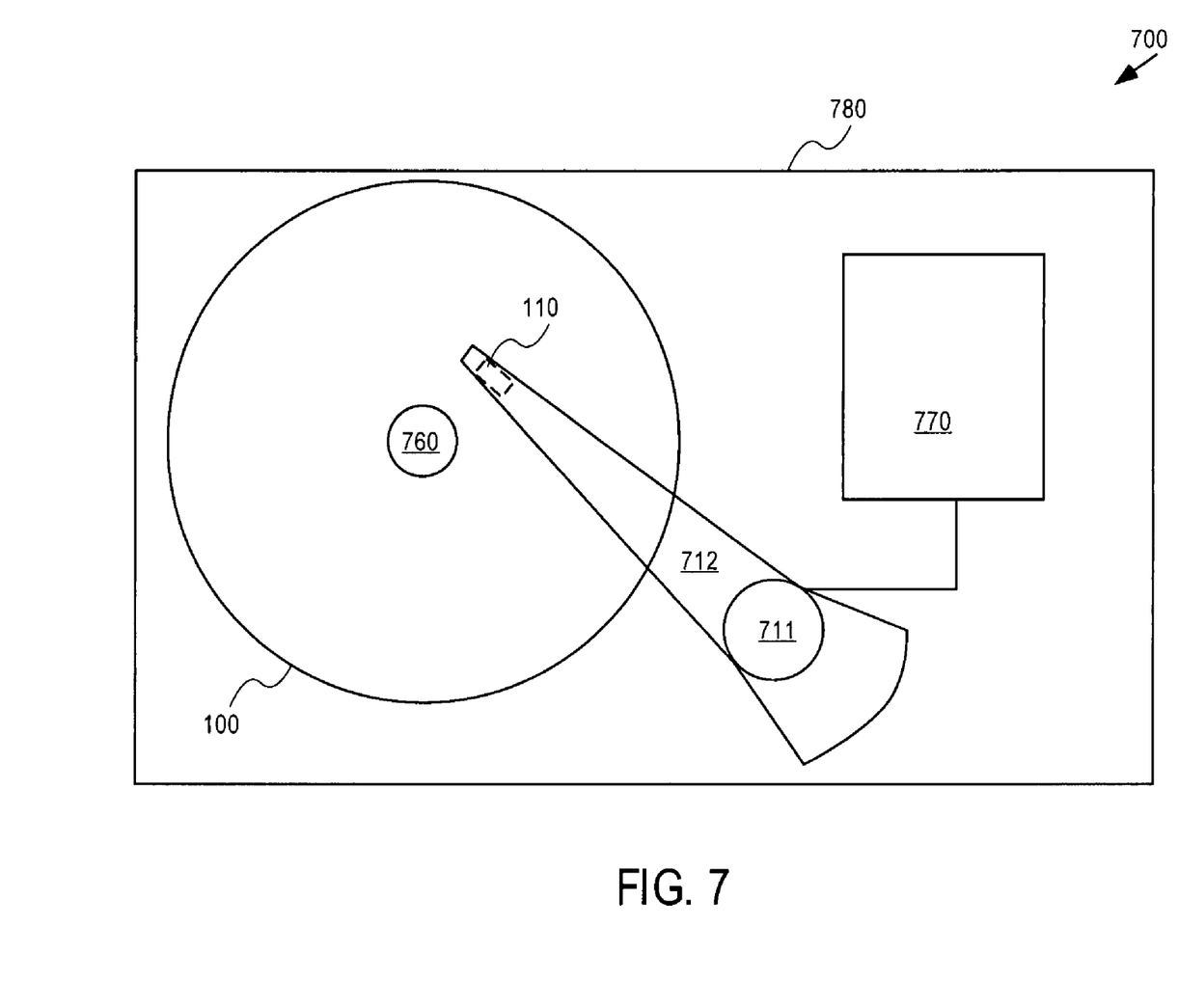
FIG. 7 illustrates one embodiment of a disk drive system.

FIG. 7 illustrates a disk drive having a disk (e.g., disk 100). Disk drive 700 may include one or more disks (e.g., disk 100) to store data. Disk 100 resides on a spindle assembly 760 that is mounted to drive housing 780. Actuator 711 is connected by a suspension arm 712 to head 110. The actuator 711 is connected to the drive housing and moves the suspension arm 712 and, thus head 110 in a radial direction to a desired location on the disk 100. A spindle motor (not shown) rotates spindle assembly 760 and, thereby, disk 100 to position head 110 at a particular location along a desired disk track well known to those of ordinary skill in the art. The position of head 110 relative to disk 100 may be controlled by position control circuitry 770 (e.g., the electronic drive intelligence software may be stored in the position control circuitry 770).

It should also be understood that the electronic drive intelligence software could also be programmed to instruct the suspension arm 712 to increase the flight height of the head over the disk. However, this method of increasing the flight height is more expensive than using the passive implementation of a magnetic disk having a safe zone to increase the flight height, as described.

Figure 8:
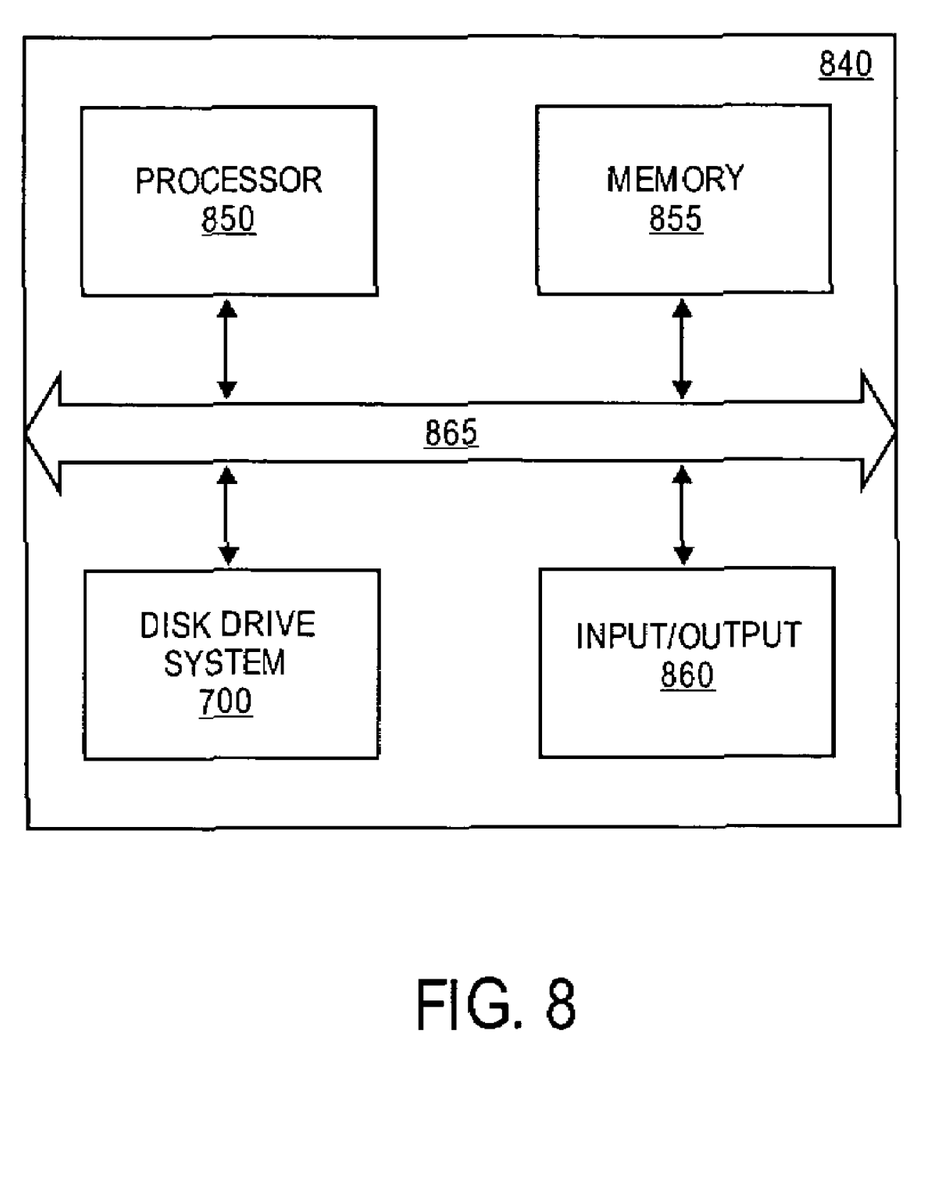
FIG. 8 illustrates one embodiment of a computer system.

It should be understood that the magnetic disk drive system 700 may be coupled to a computer system as illustrated in FIG. 8. The computer system 840 includes a processor 850, memory 855, a disk drive system 700, and input/output capability 860 coupled to a system bus 865. The memory 855 is configured to store instructions, such as the electronic drive intelligence software, that when executed by the processor 850, perform the methods described herein. Input/output 860 allows for the transfer of data to and from the magnetic disk drive system 700. In addition, Input/output 860 interface with a receiver, a transmitter, a visual display, and various types of machine-readable media, including any type of additional storage device that is accessible by the processor 850.

The description of FIG. 8 is intended to provide an overview of computer hardware and other operating components suitable for implementing the embodiments of the invention, but is not intended to limit the applicable environments. It will be appreciated that the computer system 840 is one example of many possible computer systems that have different architectures. A typical computer system will usually include at least a processor, memory, and a bus coupling the memory to the processor. One of ordinary skill in the art immediately appreciate that embodiments of the invention can be practiced with other computer system configurations, including multiprocessor systems, minicomputers, mainframe computers, and the like.

While the invention has been described in terms of several embodiments, those skilled in the art will recognize that the invention is not limited to the embodiments described. The embodiments of the invention can be practiced with modification and alteration within the scope of the appended claims. The description is thus to be regarded as illustrative instead of limiting on the invention.

What is claimed is:

1. A magnetic recording disk, comprising:
   a first zone having a plurality of data tracks to store data; and
   a second zone having a surface to increase a flight height of a head greater than when the head is over the first zone, wherein the first zone comprises a discrete track recording pattern and wherein the second zone has a planar surface relative to a surface of the first zone.

2. The disk of claim 1, wherein the planar surface of the second zone has a cross-hatch texture.

3. The disk of claim 1, wherein the planar surface of the second zone is substantially smooth.

4. The disk of claim 1, wherein the planar surface of the second zone has a radial texture.

5. The disk of claim 1, wherein the planar surface of the second zone has slanted grooves.

6. The disk of claim 1, wherein the second zone is a safe zone.

7. The disk of claim 1, further comprising:
a third zone where the head is to park when the magnetic disk is not operating.

8. The disk of claim 1, wherein the head is in contact with the magnetic disk when over the first zone.

9. A magnetic recording disk, comprising:
means for storing data from a head at a flight height; and
means for increasing the flight height of the head using a surface texture of the disk.

10. The disk of claim 9, wherein the means for increasing the flight height includes increasing air pressure between the magnetic recording disk and the head to increase the flight height of the head.

* * * * *